US012616993B2

(12) United States Patent
Ishikawa et al.

(10) Patent No.: US 12,616,993 B2
(45) Date of Patent: May 5, 2026

(54) APPLYING UNIT

(71) Applicant: FUJITSU COMPONENT LIMITED, Tokyo (JP)

(72) Inventors: Tetsuhiro Ishikawa, Tokyo (JP); Masahiro Tsuchiya, Tokyo (JP); Youichi Takamura, Tokyo (JP); Yuji Yada, Tokyo (JP); Tatsuya Oguchi, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 559 days.

(21) Appl. No.: 18/147,222

(22) Filed: Dec. 28, 2022

(65) Prior Publication Data

US 2023/0286009 A1 Sep. 14, 2023

(30) Foreign Application Priority Data

Mar. 11, 2022 (JP) ................................ 2022-037735

(51) Int. Cl.

*B05C 1/08* (2006.01)
*B05C 1/02* (2006.01)
*B41J 11/00* (2006.01)
*G03G 15/00* (2006.01)

(52) U.S. Cl.

CPC .................................. *B05C 1/025* (2013.01)

(58) Field of Classification Search

USPC ........................................................ 118/668

See application file for complete search history.

(56) References Cited

U.S. PATENT DOCUMENTS

| | | | | | |
|---|---|---|---|---|---|
| 4,833,506 | A * | 5/1989 | Kuru | G03G 15/0849 399/60 |
| 7,537,661 | B2 * | 5/2009 | Nakagawa | B41J 11/0015 118/712 |
| 9,199,407 | B2 * | 12/2015 | Kanakamedala | B29C 51/261 |
| 10,233,043 | B2 * | 3/2019 | Kawamata | B41J 13/025 |
| 2011/0277905 | A1 | 11/2011 | Koike | |
| 2012/0056927 | A1 | 3/2012 | Mitsuhashi et al. | |
| 2012/0249713 | A1 | 10/2012 | Sato et al. | |
| 2012/0300261 | A1 * | 11/2012 | Uehara | B65H 9/002 271/226 |
| 2014/0048578 | A1 | 2/2014 | Mitsuhashi et al. | |
| 2014/0373775 | A1 | 12/2014 | Koike | |
| 2017/0291432 | A1 * | 10/2017 | Campanini | B41J 11/006 |

(Continued)

FOREIGN PATENT DOCUMENTS

| | | |
|---|---|---|
| CN | 102431319 | 5/2012 |
| CN | 112455116 | 3/2021 |
| EP | 1388421 | 2/2004 |

(Continued)

*Primary Examiner* — Jethro M. Pence
(74) *Attorney, Agent, or Firm* — IPUSA, PLLC

(57) ABSTRACT

According to one aspect of the present disclosure, an applying unit that can be connected to a printer and apply an adhesive to a recording sheet includes: a roller configured to transport the recording sheet that is discharged from the printer; a sensor configured to detect the bend of the recording sheet; an applying portion configured to apply the adhesive to the recording sheet; and a control device configured to adjust the rotation speed of the roller according to the value detected by the sensor.

2 Claims, 13 Drawing Sheets

(56) References Cited

U.S. PATENT DOCUMENTS

2023/0286009 A1* 9/2023 Ishikawa ................ B41J 11/703

FOREIGN PATENT DOCUMENTS

| | | |
|---|---|---|
| EP | 3240693 | 11/2017 |
| JP | S62-108098 | 5/1987 |
| JP | 2001-018478 | 1/2001 |
| JP | 2004-058518 | 2/2004 |
| JP | 2011-235595 | 11/2011 |
| JP | 2014-097851 | 5/2014 |
| JP | 2020-019582 | 2/2020 |
| WO | 2016/108170 | 7/2016 |

* cited by examiner

APPLYING UNIT

CROSS-REFERENCE TO RELATED APPLICATION

This application is based upon and claims the benefit of priority of Japanese Patent Application No. 2022-037735, filed on Mar. 11, 2022, the entire contents of which are incorporated herein by reference.

TECHNICAL FIELD

A certain aspect of the embodiment is related to an applying unit.

BACKGROUND

There are printers that are known to include a printing part that prints on a recording sheet and a transfer part that transfers an adhesive to the recording sheet.

RELATED ART

[Patent Document 1] Unexamined Japanese Patent Application Publication No. 2020-019582
[Patent Document 2] Unexamined Japanese Patent Application Publication No. 2014-097851
[Patent Document 3] Unexamined Japanese Patent Application Publication No. 2011-235595
[Patent Document 4] Unexamined Japanese Patent Application Publication No. 2001-018478

SUMMARY

Figure 1:
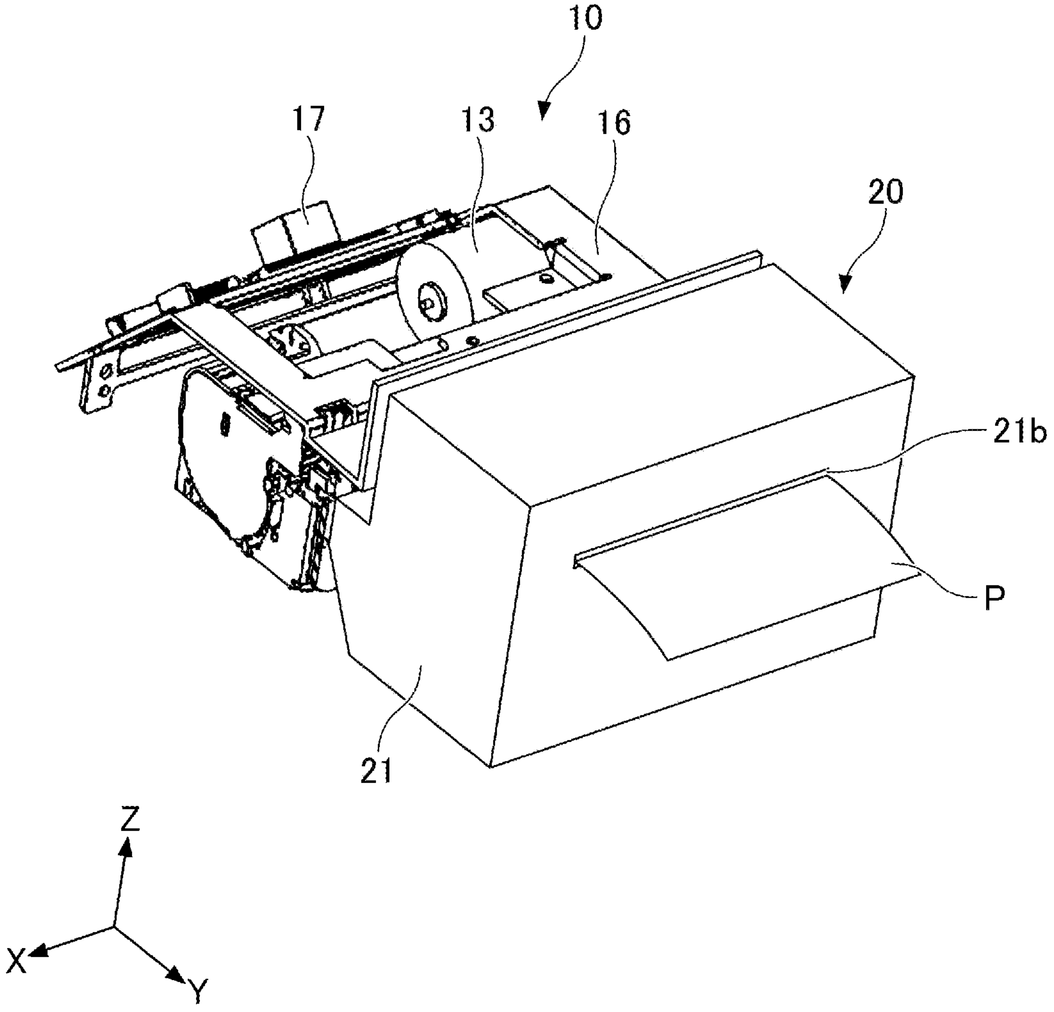
FIG. 1 is a perspective view of a printer to which an applying unit according to the present embodiment is attached.

Assuming that a printer has no part for transferring an adhesive, it is conceivable to retrofit a transfer part to the printer and transfer an adhesive to a recording sheet that has been printed. However, retrofitting a transfer part to a printer is not an easy task and requires complex control.

Therefore, there is a demand for an applying unit that can be retrofitted to various printers without necessitating complex control.

According to one aspect of the present disclosure, an applying unit that can be connected to a printer and apply an adhesive to a recording sheet includes: a roller configured to transport the recording sheet that is discharged from the printer; a sensor configured to detect the bend of the recording sheet; an applying portion configured to apply the adhesive to the recording sheet; and a control device configured to adjust the rotation speed of the roller according to the value detected by the sensor.

DESCRIPTION OF EMBODIMENTS

Hereinafter, a description will be given of an embodiment of the present invention with reference to the drawings.

Now, a non-limiting example embodiment of the present disclosure will be described with reference to the accompanying drawings. Throughout the drawings, the same or corresponding members or parts will be assigned the same or corresponding reference numerals, and overlapping description will be omitted.

Figure 2:
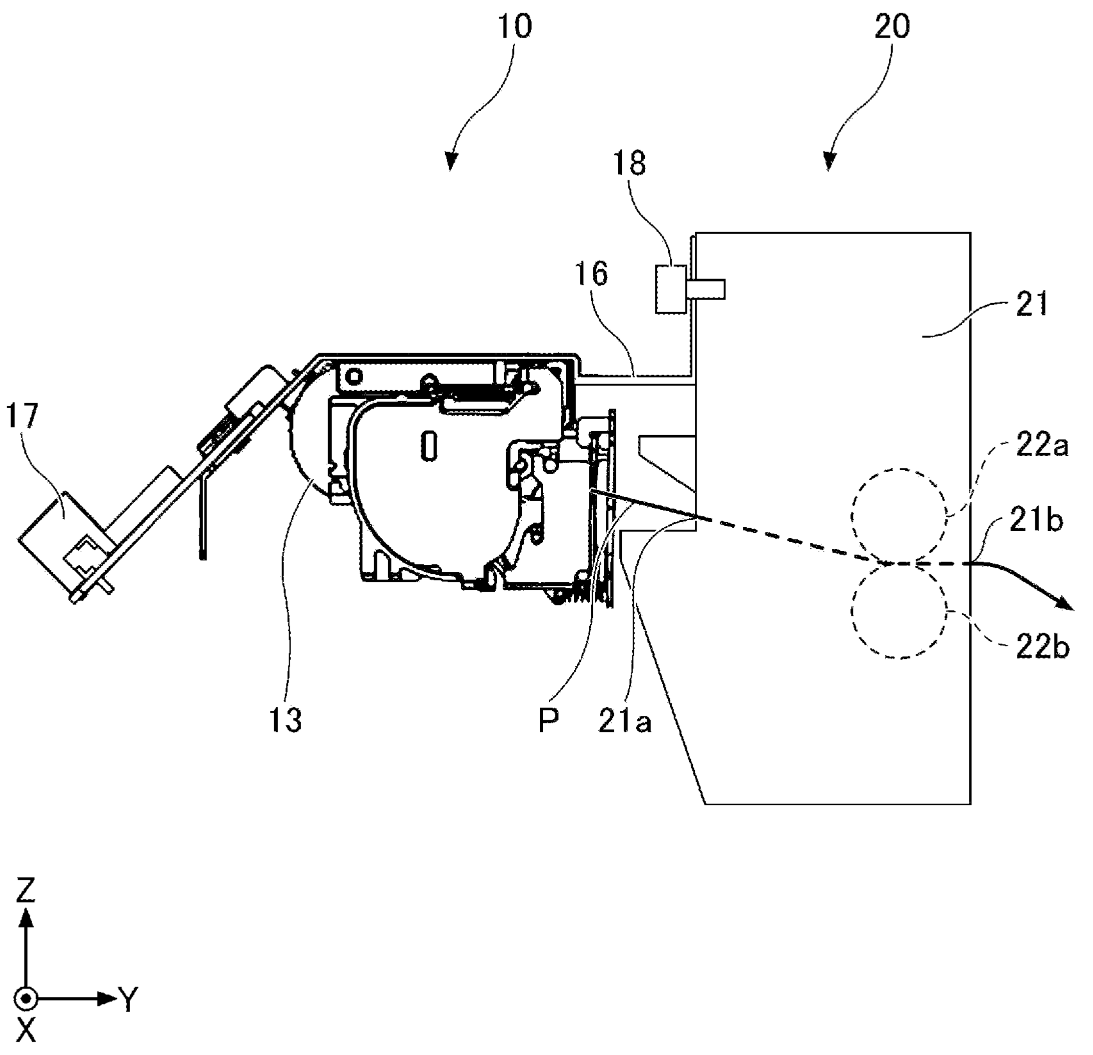
FIG. 2 is a side view of the printer to which the applying unit is attached.
Figure 3:
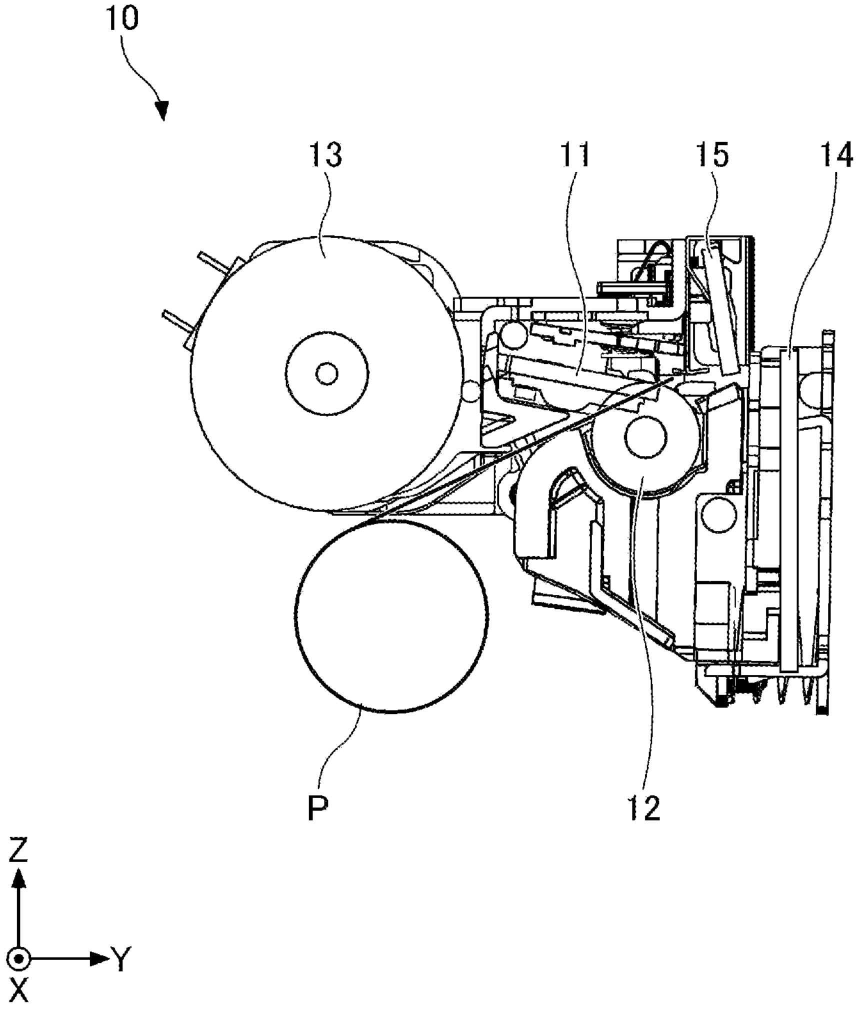
FIG. 3 is a side view illustrating an internal structure of the printer.
Figure 4:
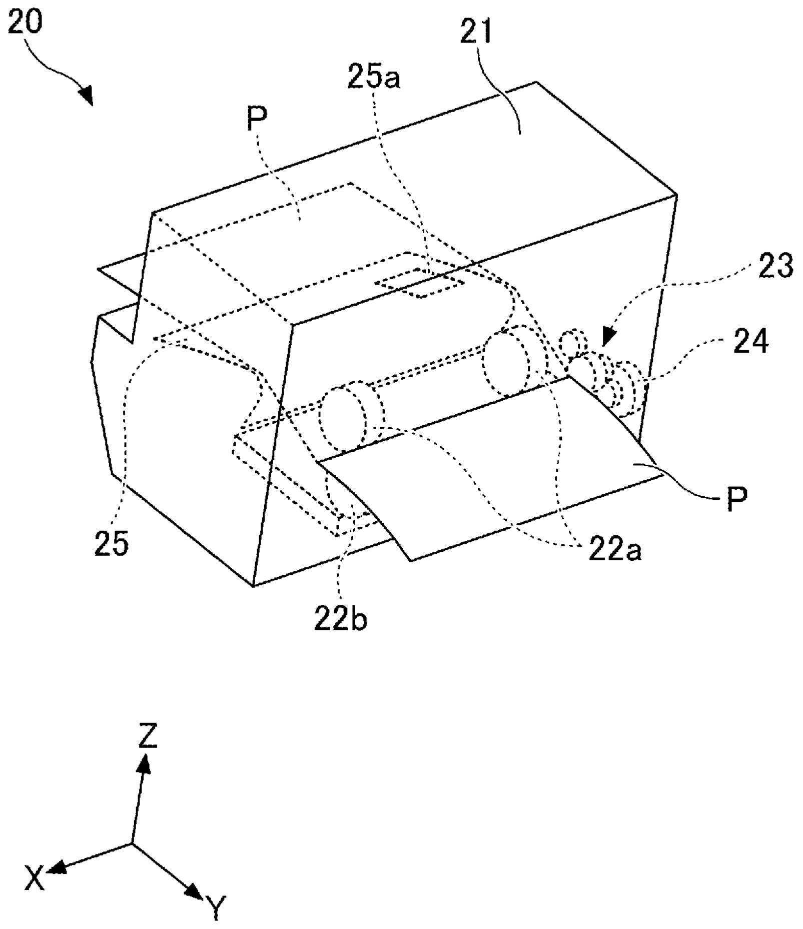
FIG. 4 is a perspective view illustrating an internal structure of the applying unit.
Figure 5:
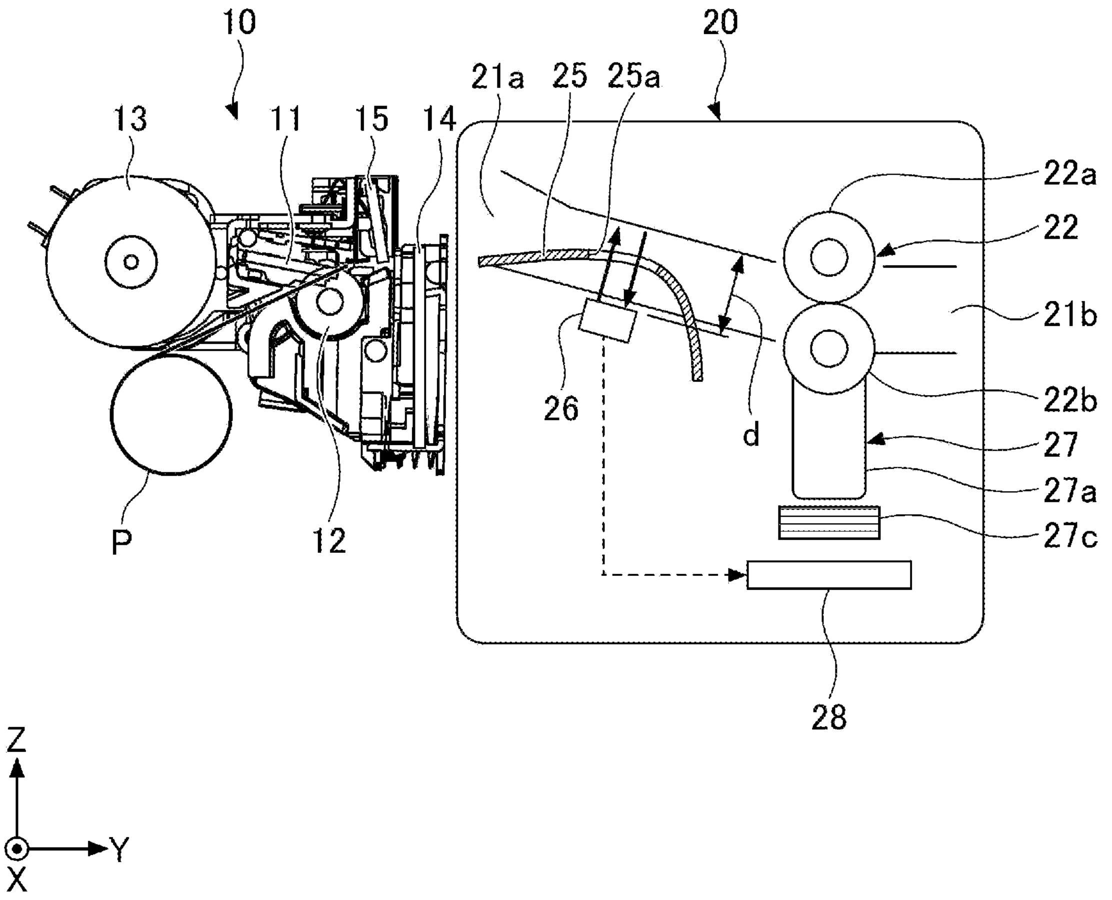
FIG. 5 is a side view illustrating an internal structure of the applying unit.
Figure 6:
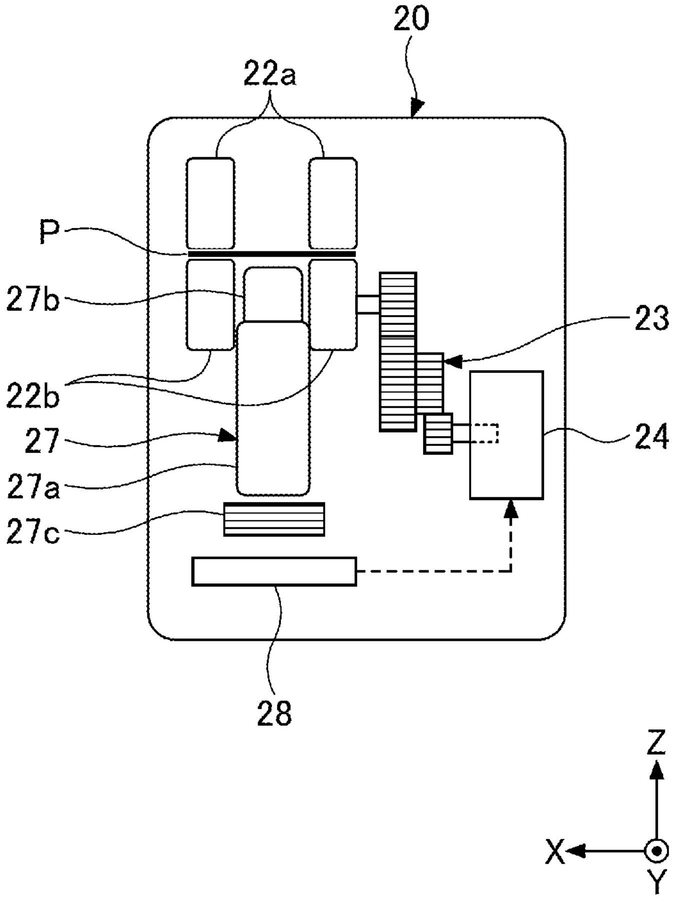
FIG. 6 is a front view illustrating an internal structure of the applying unit.

Now, an example of a printer to which the applying unit of this embodiment is attached will be described with reference to FIG. 1 to FIG. 3.

A printer 10 is, for example, a thermal printer, and is installed in an ATM (Automated Teller Machine), a ticket vending machine, a kiosk terminal, or the like. However, the type of the printer is not limited to a thermal printer, and other printers such as an inkjet printer and a laser printer may be used as well.

The printer 10 has a thermal head 11, a platen roller 12, a motor 13, a movable blade 14, a fixed blade 15, a frame 16, and a control substrate 17. The printer 10 sandwiches a recording sheet P between the thermal head 11 and the platen roller 12, and prints on the recording sheet P by feeding the recording paper P by the rotation of the platen roller 12, and by pressing the recording sheet P against the thermal head 11. The motor 13 rotates the platen roller 12. The movable blade 14 and the fixed blade 15 constitute a cutter, and the recording sheet P is cut by moving the movable blade 14 toward the fixed blade 15. The control substrate 17 is attached to the frame 16. The control substrate 17 controls the operation of the printer 10.

An example of the applying unit of this embodiment will be described with reference to FIG. 4 to FIG. 8. In the drawings, the X direction is the width direction of the sheet, and the Z direction is the vertical direction with respect to the sheet surface.

The applying unit 20 has a housing 21, rollers 22, a gear array 23, a motor 24, a pressing portion 25, a sensor 26, an applying portion 27, and a control device 28.

The housing 21 accommodates the rollers 22, the gear array 23, the motor 24, the pressing portion 25, the sensor 26, the applying portion 27, and the control device 28. The frame 16 is screwed to the housing 21 with a screw 18. By this means, the applying unit 20 is connected to the printer 10. The housing 21 includes a feed port 21*a* and a discharge port 21*b*. The feed port 21*a* is an opening for carrying the recording sheet P, discharged from the printer 10, into the housing 21. The discharge port 21*b* is an opening for discharging the recording sheet P to the outside of the housing 21.

The rollers 22 transport the recording sheet P discharged from the printer 10. In this embodiment, the rollers 22 include upper rollers 22*a* and lower rollers 22*b*. A pair of upper rollers 22*a* are provided near both widthwise ends of the recording sheet P. A pair of lower rollers 22*b* are provided below the upper rollers 22*a* so as to be in contact with the upper rollers 22*a*. The lower rollers 22*b* are connected to the motor 24 via the gear array 23. By rotating the motor 24, the gear array 23 also rotates, and this rotation is transmitted to rotate the lower rollers 22*b*. As a result of this, when the recording sheet P is carried into the housing 21 from the feed port 21*a*, both end portions of the recording paper P are sandwiched between the upper rollers 22*a* and the lower rollers 22*b*, and discharged out of the housing 21 from the discharge port 21*b*. Note that the upper rollers 22*a* may be rotated by connecting the motor to the upper rollers 22*a* via the gear array. The upper rollers 22*a* and the lower rollers 22*b* may also be rotated by connecting the motor to both the upper rollers 22*a* and the lower rollers 22*b* via the gear array.

The gear array 23 includes a plurality of gears, and transmits the power of the motor 24 to the lower rollers 22*b*.

The motor 24 rotates the lower rollers 22*b* via the gear array 23. The rotation of the motor 24 is controlled based on commands from the control device 28. The motor 24 is, for example, a servo motor.

The pressing portion 25 is provided on the transport path of the recording sheet P between the feed port 21*a* and the rollers 22. The recording sheet P to be transported by the rollers 22 is preloaded by the pressing portion 25 in a direction away from the sensor 26 and pressed in the +Z direction, thereby causing the recording sheet P to bend. The pressing portion 25 is provided with an opening 25*a*, so that the light projected by the sensor 26 can pass therethrough. The shape of the opening 25*a* is, for example, rectangular. The pressing portion 25 is, for example, a leaf spring.

Figure 7:
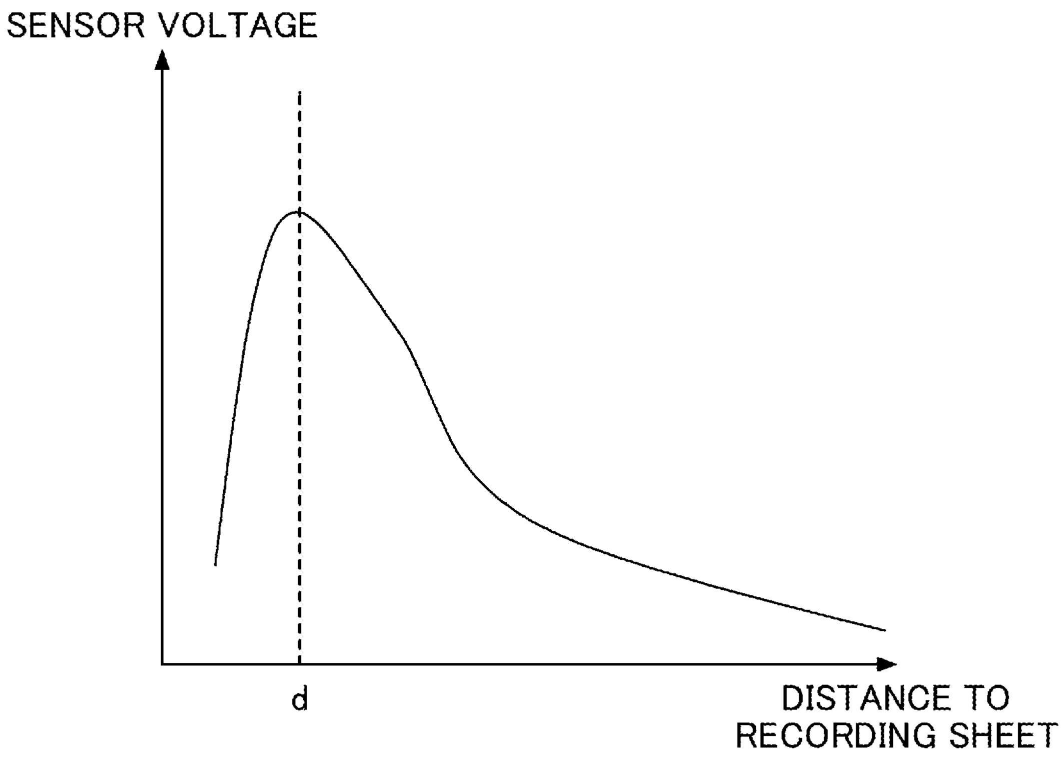
FIG. 7 illustrates an example of an output waveform of a sensor.
Figure 8:
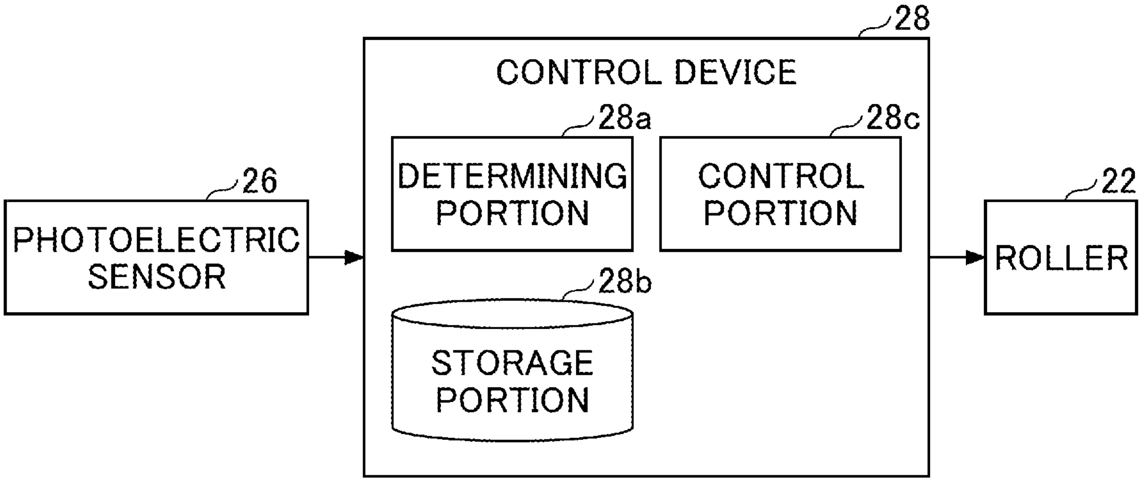
FIG. 8 illustrates an example of a functional configuration of a control device.

The sensor 26 is, for example, a photoelectric sensor, and provided at a position corresponding to the opening 25*a*. The sensor 26 projects light toward the opening 25*a*, detects the light reflected by the recording sheet P, converts the changes in the amount of detected light into a voltage signal, and transmits the voltage signal to the control device 28. FIG. 7 is a diagram illustrating an example of the sensor's output waveform, where the horizontal axis is the distance from the sensor 26 to the recording sheet P, and the vertical axis is the voltage output by the sensor 26 (sensor voltage). As shown in FIG. 7, the sensor 26 has a characteristic of showing the maximum value when the distance from the sensor 26 to the recording sheet P is equal to a distance d, which is the distance from the sensor 26 to the +Z-side wall of the transport path (see FIG. 5). When the recording sheet P transported by the rollers 22 is bent the most, the distance from the sensor 26 to the recording sheet P becomes equal to the distance d, and therefore the sensor voltage shows the maximum value. On the other hand, when the transported the recording sheet P is bent only a little, the distance from the sensor 26 to the recording sheet P becomes shorter than the distance d, and so the sensor voltage becomes smaller than the maximum value. The transport path is made of a material that reflects a smaller amount of light than the recording sheet P, such as black resin. When there is no recording sheet P at the detection position of the sensor 26, the sensor voltage becomes smaller than when the distance from the sensor 26 to the recording sheet P is d. Note that the above-described characteristic of the sensor 26 is by no means limiting, and, for example, the sensor 26 may have a characteristic in which the sensor voltage decreases or increases as the distance from the sensor 26 to the recording sheet P increases.

The applying portion 27 is provided between the pair of lower rollers 22*b*. The applying portion 27 applies an adhesive to the lower surface of the recording sheet P transported by the rollers 22. In this embodiment, the applying portion 27 includes a holding portion 27*a*, an adhesive portion 27*b*, and a pressing portion 27*c*. The holding portion 27*a* holds the adhesive portion 27*b* exposed upward (facing the recording sheet P). The adhesive portion 27*b* is a solid adhesive. However, the adhesive portion 27*b* may be a liquid adhesive as well. The pressing portion 27*c* presses the holding portion 27*a* upward, so as to press the adhesive portion 27*b* against the lower surface of the recording sheet P and apply the adhesive. The pressing portion 27*c* is, for example, a coil spring.

The control device 28 adjusts the rotation speed of the lower rollers 22*b* according to the detection value of the sensor 26. The control device 28 includes a determining portion 28*a*, a storage portion 28*b*, and a control portion 28*c*.

When the detection value of the sensor 26 is equal to or greater than a presence determining value, the determining portion 28*a* determines that the recording sheet P is in the applying unit 20. On the other hand, when the detection value of the sensor 26 is less than the presence determining value, the determining portion 28*a* determines that the recording sheet P is not in the applying unit 20. The presence determining value is a preset value.

Also, when the detection value of the sensor 26 is equal to or greater than a bend determining value, the determining portion 28*a* determines that the recording sheet P is bent. On the other hand, when the detection value of the sensor 26 is less than the bend determining value, the determining portion 28*a* determines that the recording sheet P is not bent or is bent only a little. The bend determining value is a preset value, set to a larger value than the presence determining value, and set to a smaller value than the sensor voltage when the recording sheet P is present at a position corresponding to the distance d.

The storage portion 28*b* stores various information. The various information includes the presence determining value and the bend determining value.

The control portion 28*c* adjusts the rotation speed of the lower rollers 22*b* based on the determination result of the determining portion 28*a*. When the determining portion 28*a* determines that the recording sheet P is not present in the applying unit 20, the control portion 28*c* stops the lower rollers 22*b* by stopping the motor 24.

Also, when the determining portion 28*a* determines that the recording sheet P is bent, the control portion 28*c* increases the rotation speed of the motor 24 according to the difference between the sensor voltage and the bend determining value, and rotates the lower rollers 22*b* at a higher speed. By this means, the transport speed of the recording sheet P in the applying unit 20 becomes closer to the transport speed in the printer 10, and the bend of the recording sheet P becomes smaller. On the other hand, when the determining portion 28*a* determines that the recording sheet P transported by the rollers 22 is not bent or is bent only a little, the control portion 28*c* slows down the rotation speed of the motor 24 according to the difference between the sensor voltage and the bend determining value, and rotates the lower rollers 22*b* at a lower speed. By this means, the transport speed in the applying unit 20 becomes closer to the transport speed in the printer 10.

Now, an example operation of the applying unit 20 when the printer 10 prints on the upper surface of the recording sheet P and the applying unit 20 applies an adhesive to the lower surface of the recording sheet P will be described with reference to FIG. 9A to FIG. 14B. FIG. 9A to FIG. 14B are diagrams for explaining the states of the applying unit 20, in which the printer 10 prints on the recording sheet P, the applying unit 20 applies an adhesive to the recording sheet P, and the recording sheet P is discharged from the applying unit 20. In FIG. 9A to FIG. 14B, each "A" diagram is a schematic view that illustrates an internal structure of the applying unit 20, and each "B" diagram is a view that illustrates the detected values of the sensor 26.

Figure 9A:
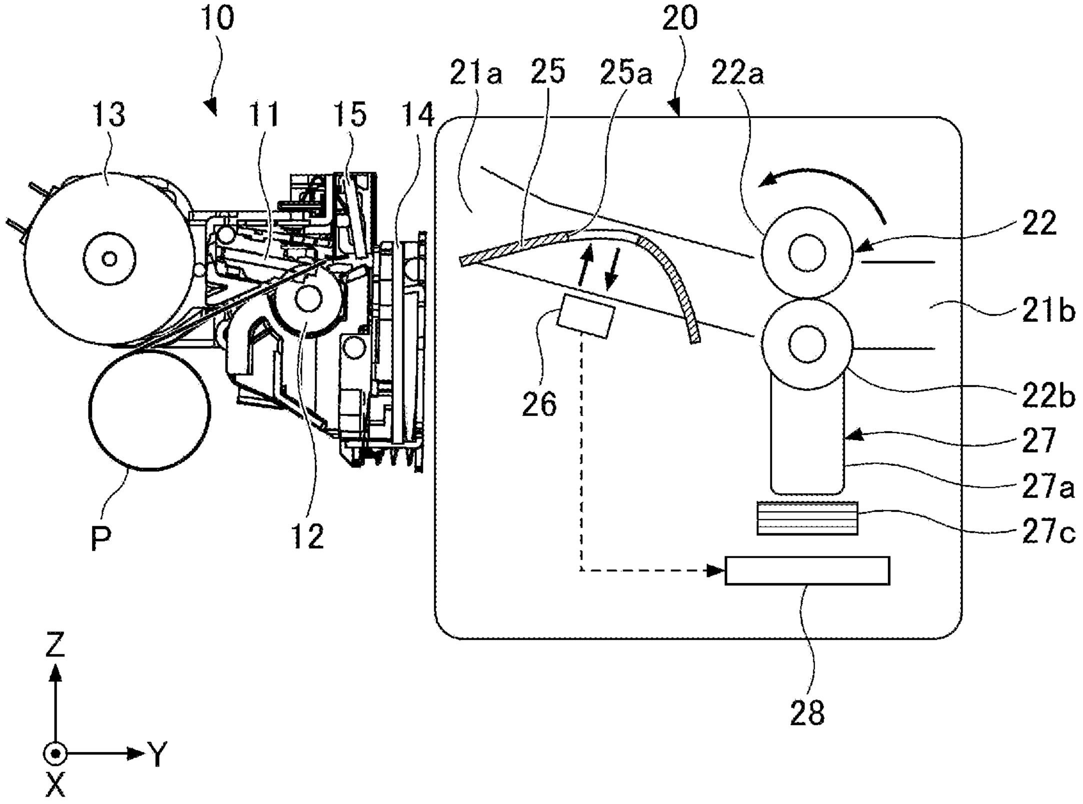
FIG. 9A illustrates an example (1) of the operation of the applying unit.
Figure 9B:
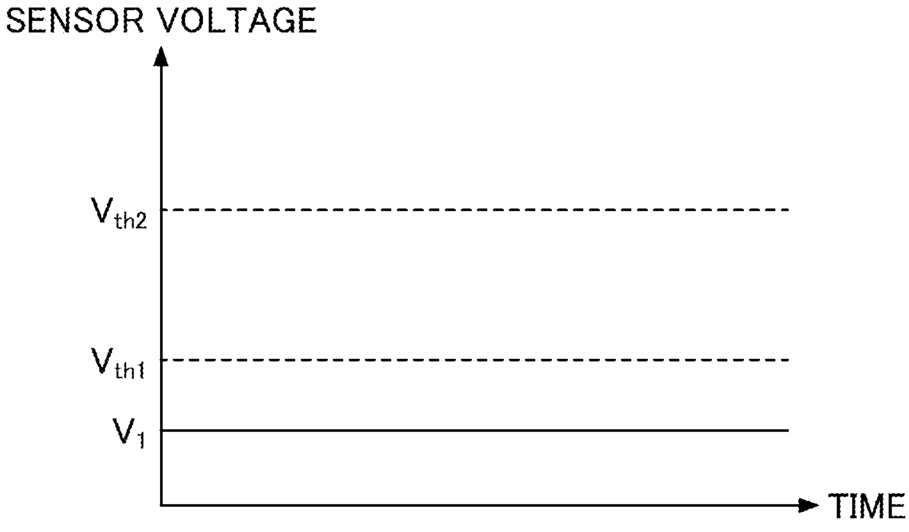
FIG. 9B illustrates an example (1) of the operation of the applying unit.

FIGS. 9A and 9B are diagrams for explaining the state of the applying unit 20 when the printer 10 starts operating. As shown in FIG. 9A, no the recording sheet P has been transported to the rollers 22 of the applying unit 20 when the printer 10 starts operating. At this point in time, as shown in FIG. 9B, the sensor 26 outputs a voltage value V1 that is smaller than a presence determining value Vth1. The control device 28 determines that the recording sheet P is not present in the applying unit 20, based on the output of the sensor 26.

Figure 10A:
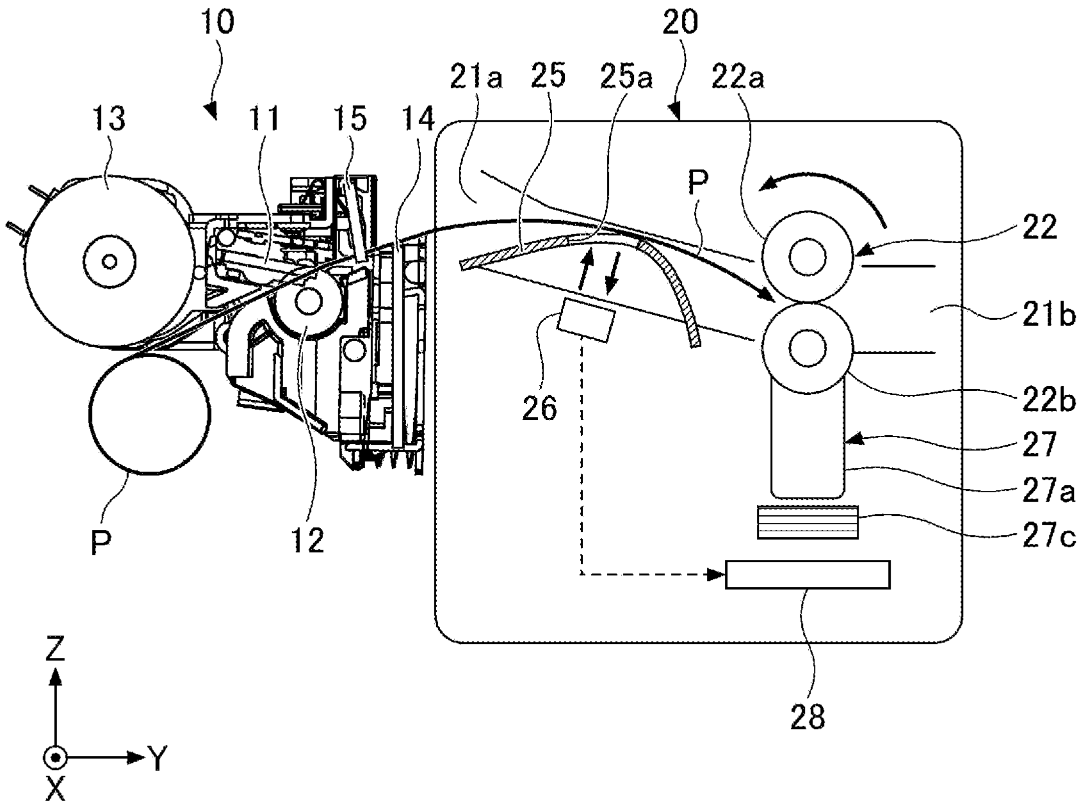
FIG. 10A illustrates an example (2) of the operation of the applying unit.
Figure 10B:
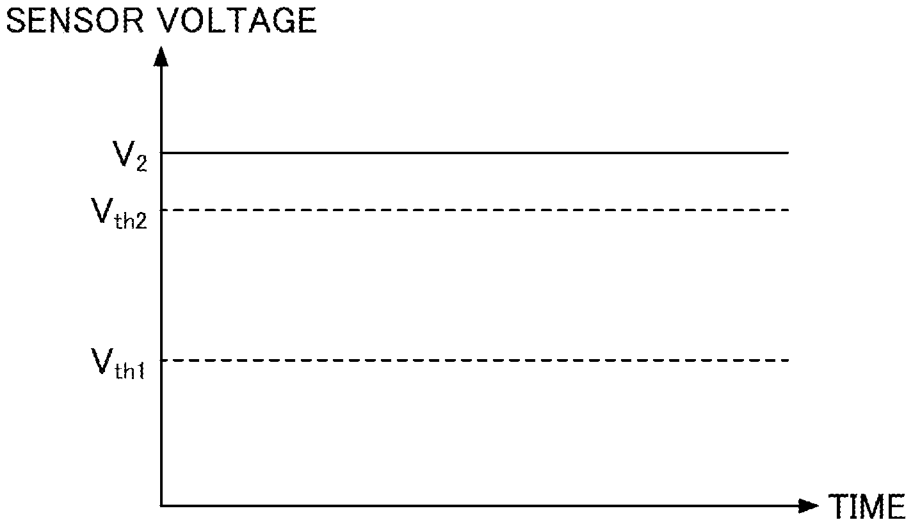
FIG. 10B illustrates an example (2) of the operation of the applying unit.

FIGS. 10A and 10B are diagrams for explaining the state of the applying unit 20 when the recording sheet P is passed from the printer 10 onto the applying unit 20. As shown in FIG. 10A, when the recording sheet P is passed from the printer 10 onto the applying unit 20, the recording sheet P is pressed by the pressing portion 25 in a direction away from the sensor 26, and therefore the distance from the sensor 26 to the recording sheet P becomes d, and the recording sheet P is transported in the direction of the rollers 22. At this time, as shown in FIG. 10B, the sensor 26 outputs a voltage value V2, which is larger than a presence determining value Vth1 and a bend determining value Vth2. Based on the output of the sensor 26, the control device 28 determines that the recording sheet P is present in the applying unit 20 and that the recording sheet P is bent. Also, in accordance with this determination result, the control device 28 increases the rotation speed of the motor 24 to rotate the lower rollers 22*b* at a higher speed and reduce the bend of the recording sheet P.

Figure 11A:
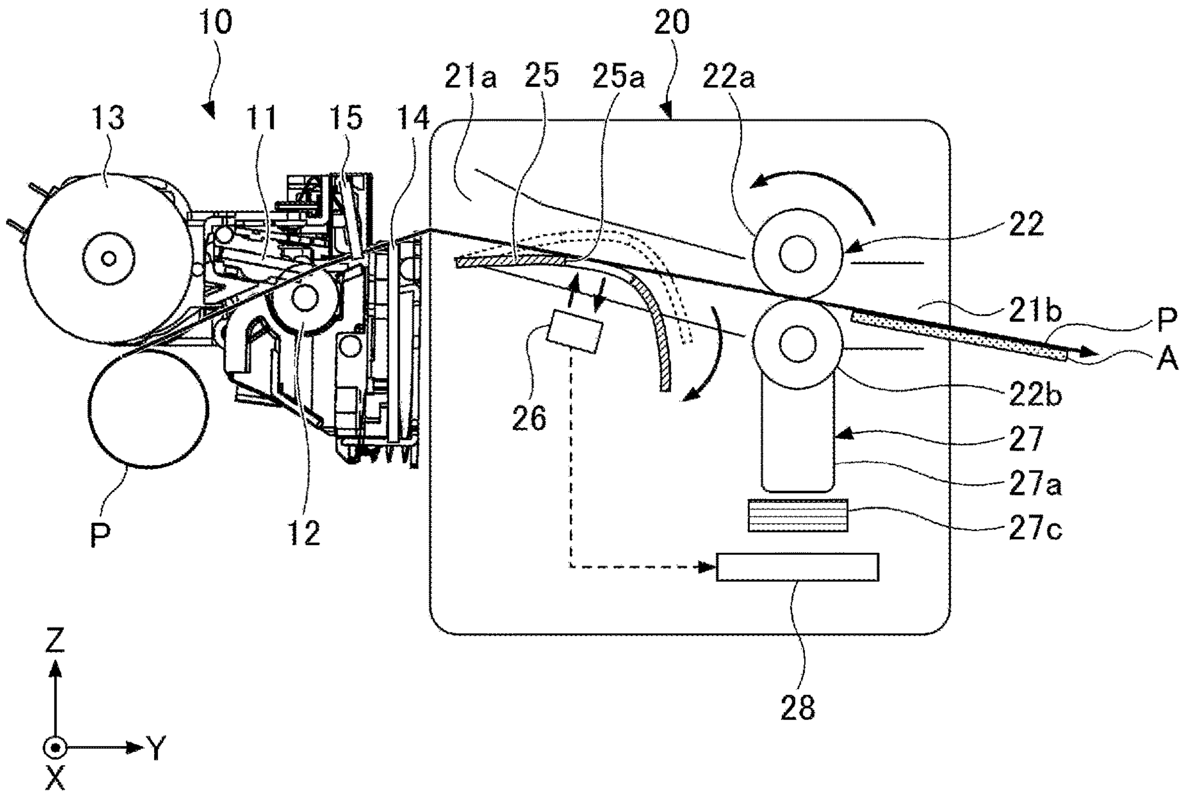
FIG. 11A illustrates an example (3) of the operation of the applying unit.
Figure 11B:
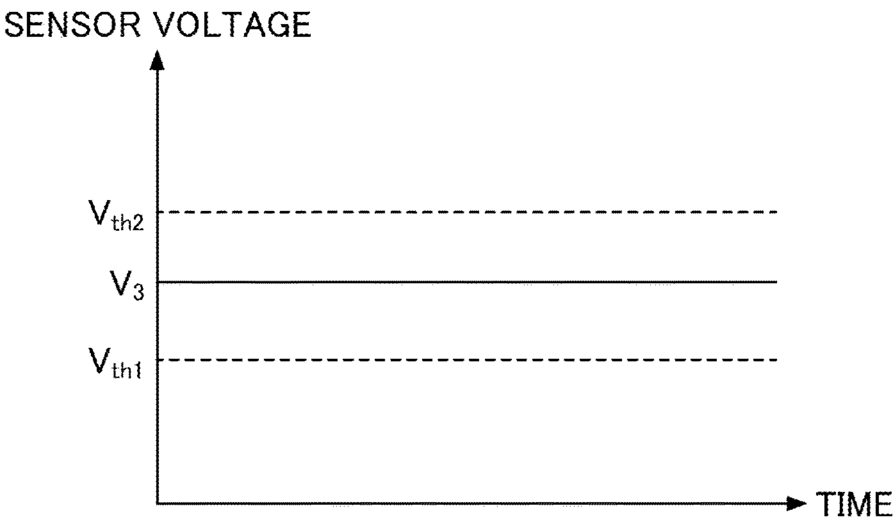
FIG. 11B illustrates an example (3) of the operation of the applying unit.

FIG. 11 is a diagram for explaining the state of the applying unit 20 when the transport speed of the recording sheet P in the applying unit 20 is higher than the transport speed in the printer 10. As shown in FIG. 11A, in the event the transport speed in the applying unit 20 is faster than the transport speed in the printer 10, the recording sheet P is pulled by the rollers 22, so that the pressing portion 25 is pressed downward in the −Z direction, and the recording sheet P approaches the sensor 26. At this time, as shown in FIG. 11B, the sensor 26 outputs a voltage value V3 that is larger than presence determining value Vth1 and smaller than bend determining value Vth2. Based on the output of the sensor 26, the control device 28 determines that the recording sheet P is present in the applying unit 20 and that the recording sheet P is not bent or is bent only a little. Also, in accordance with this determination result, the control device 28 lowers the rotation speed of the motor 24 to rotate the lower rollers 22*b* at a lower speed. By this means, the transport speed in the applying unit 20 becomes closer to the transport speed in the printer 10, and the bend of the recording sheet P becomes smaller. The applying portion 27 applies an adhesive A to the recording sheet P, and the recording sheet P is transported toward the discharge port 21*b*.

Figure 12A:
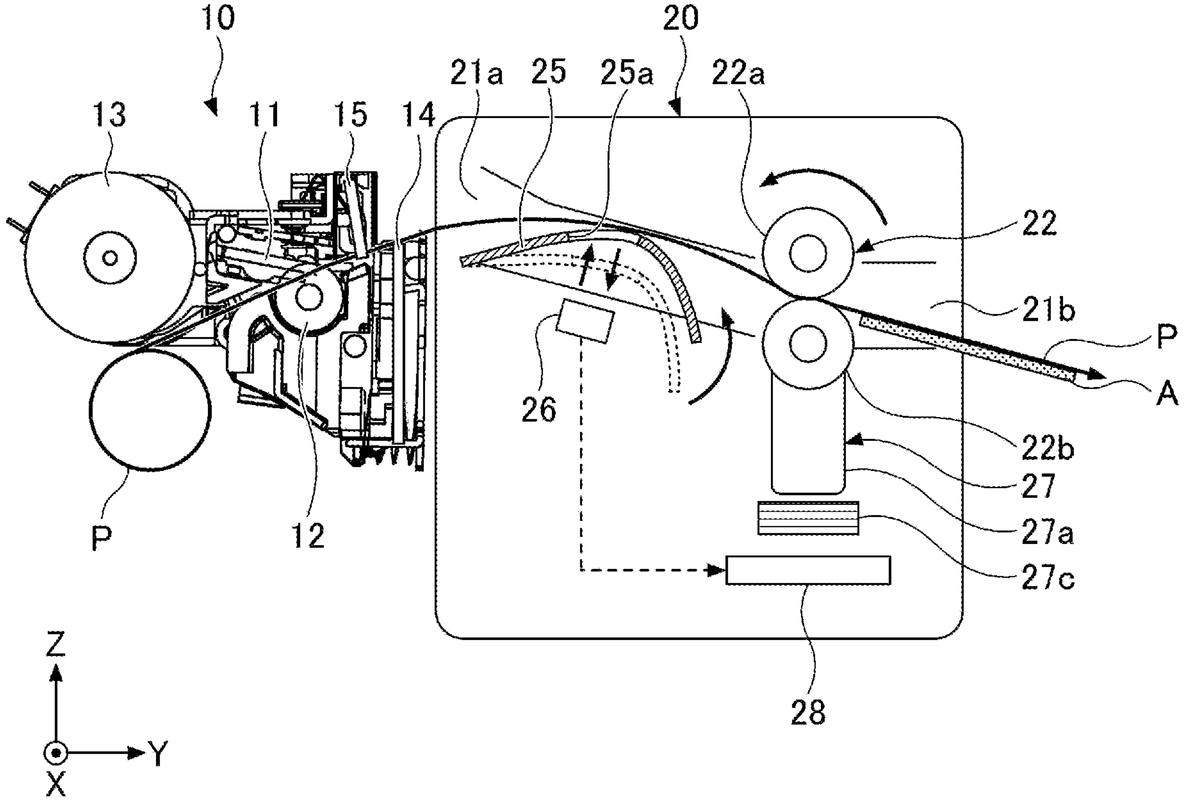
FIG. 12A illustrates an example (4) of the operation of the applying unit.
Figure 12B:
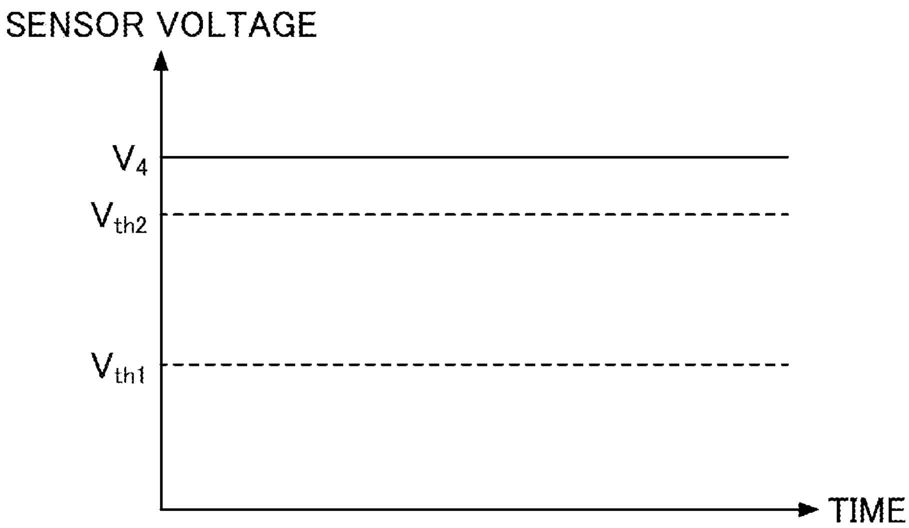
FIG. 12B illustrates an example (4) of the operation of the applying unit.

FIGS. 12A and 12B are diagrams for explaining the state of the applying unit 20 when the transport speed of the recording sheet P in the applying unit 20 is slower than the transport speed of the recording sheet P in the printer 10. As shown in FIG. 12A, in the event the transport speed in the applying unit 20 is slower than the transport speed in the printer 10, the tension of the recording sheet P between the printer 10 and the rollers 22 weakens, and the recording sheet P is pressed by the pressing portion 25 in a direction away from the sensor 26. Consequently, the recording sheet P moves away from the sensor 26. At this time, as shown in FIG. 12B, the sensor 26 outputs a voltage value V4 that is greater than presence determining value Vth1 and bend determining value Vth2. Based on the output of the sensor 26, the control device 28 determines that the recording sheet P is in the applying unit 20 and that the recording sheet P is bent. Also, in accordance with this determination result, the control device 28 receives and increases the rotation speed of the motor 24 to rotate the lower rollers 22*b* at a higher speed. By this means, the transport speed in the applying unit 20 becomes closer to the transport speed in the printer 10.

The control device 28 thus repeatedly controls the rotation speed of the motor 24 shown in FIGS. 11A and 11B and FIGS. 12A and 12B while the recording sheet P is transported by the rollers 22. By this means, regardless of the transport speed in the printer 10, the transport speed in the applying unit 20 can be made to follow the transport speed in the printer 10. As a result of this, even when the applying unit 20 is connected to various printers, the recording sheet P can be uniformly coated with the adhesive. That is, it is possible to provide a highly versatile applying unit 20 that can be retrofitted to various printers without necessitating complex control.

Figure 13A:
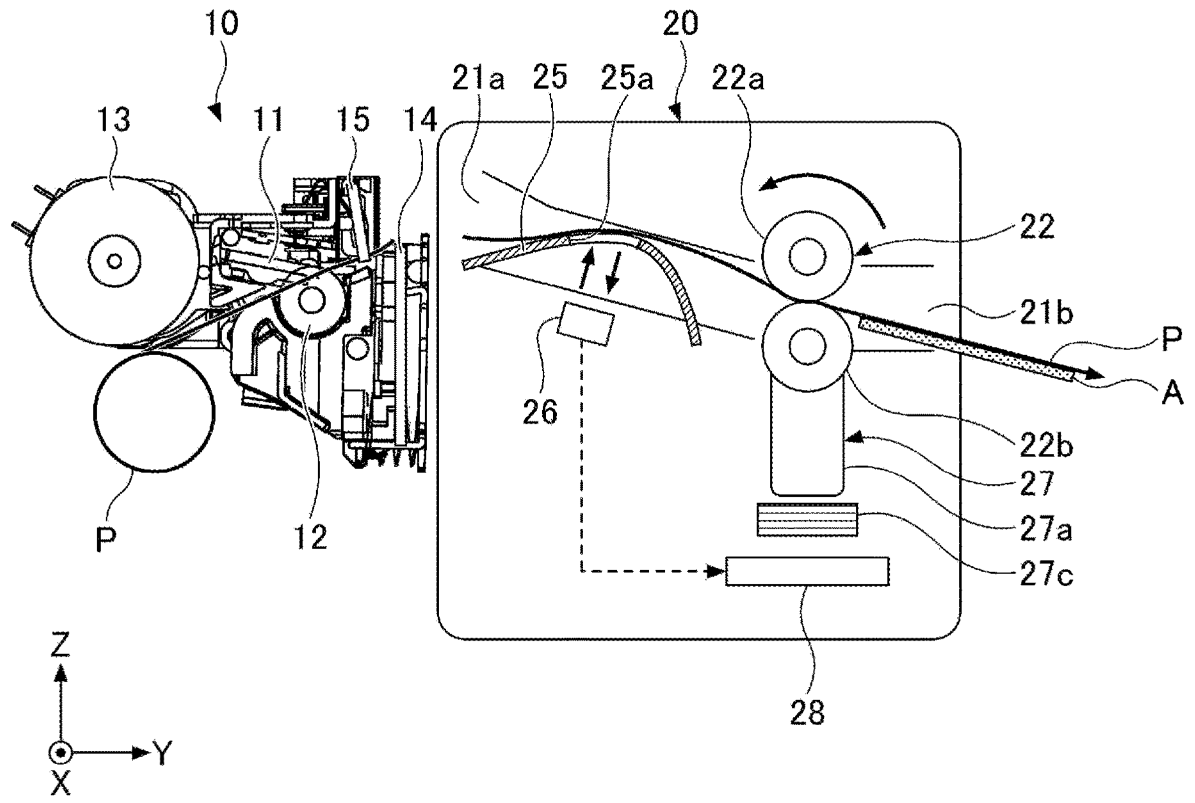
FIG. 13A illustrates an example (5) of the operation of the applying unit.
Figure 13B:
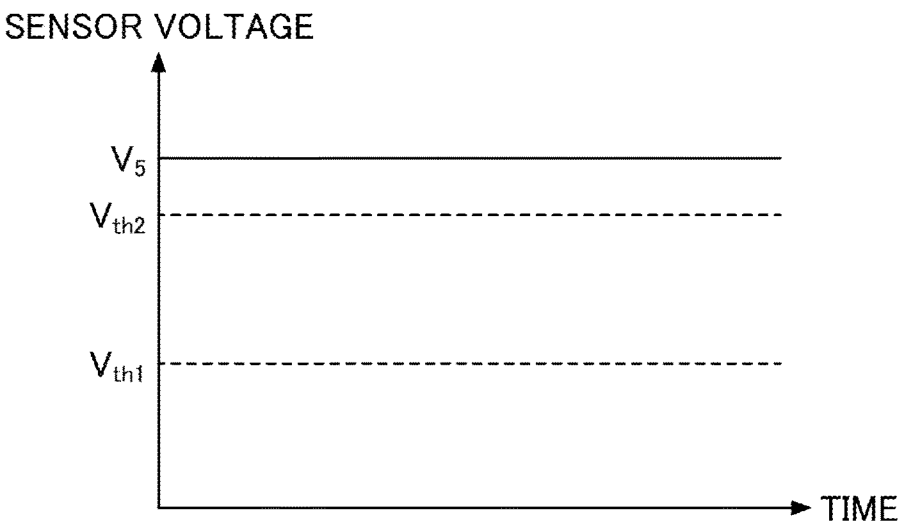
FIG. 13B illustrates an example (5) of the operation of the applying unit.

FIGS. 13A and 13B are diagrams for explaining the state of the applying unit 20 when the recording sheet P is cut in the printer 10. As shown in FIG. 13A, when the recording sheet P is cut, the recording sheet P is pressed by the pre-loading of the pressing portion 25 in a direction away from the sensor 26, and so the distance from the sensor 26 to the recording sheet P is d. At this time, as shown in FIG. 13B, the sensor 26 outputs a voltage value V5 that is greater than presence determining value Vth1 and bend determining value Vth2. Based on the output of the sensor 26, the control device 28 determines that the recording sheet P is in the applying unit 20 and that the recording sheet P is bent. Also, in accordance with this determination result, the control device 28 increases the rotation speed of the motor 24 to a higher speed than shortly before the recording sheet P is cut, so as to rotate the lower rollers 22*b* at a higher speed. By this means, the recording sheet P coated with the adhesive A is discharged from the discharge port 21*b*.

Figure 14A:
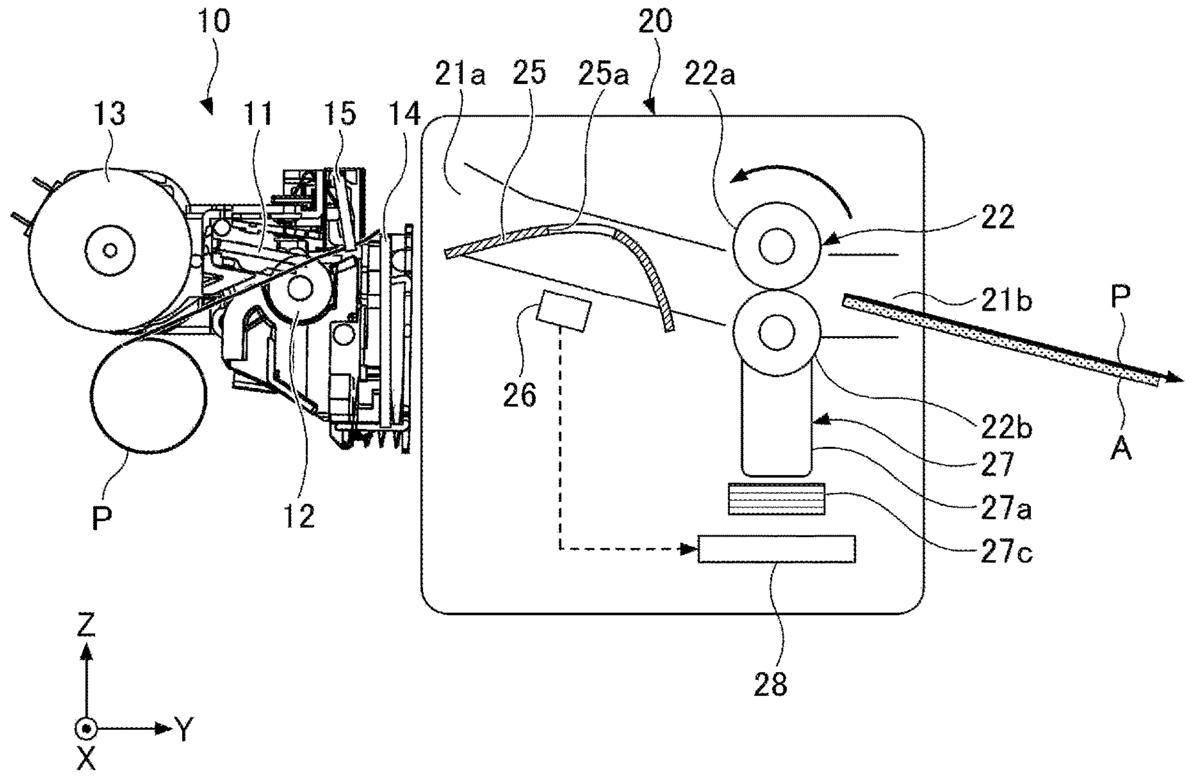
FIG. 14A illustrates an example (6) of the operation of the applying unit.
Figure 14B:
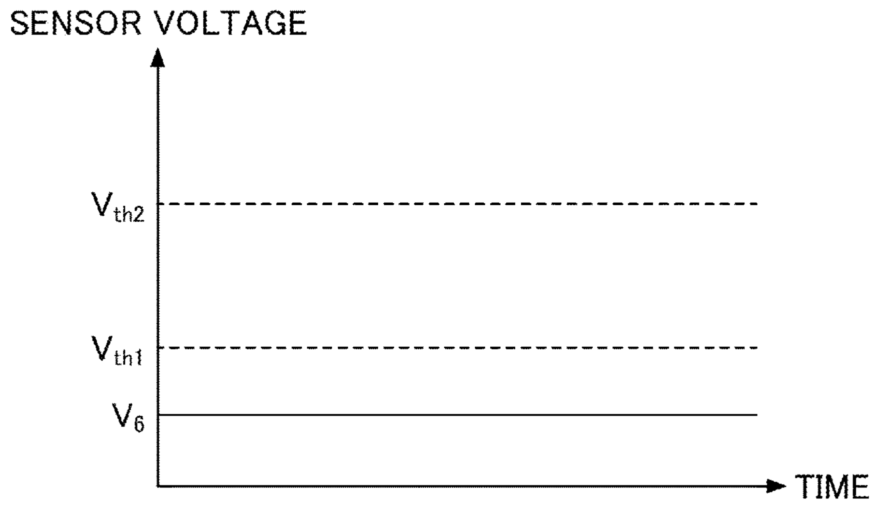
FIG. 14B illustrates an example (6) of the operation of the applying unit.

FIGS. 14A and 14B are diagrams for explaining the state of the applying unit 20 when the recording sheet P is discharged from the applying unit 20. As shown in FIG. 14A, when the recording sheet P is discharged from the applying unit 20, the recording sheet P is not at the detection position of the sensor 26. Consequently, as shown in FIG. 14B, the sensor 26 outputs a voltage value V6 that is smaller than presence determining value Vth1. Based on the output of the sensor 26, the control device 28 determines that the recording sheet P is not in the applying unit 20. Also, in accordance with this determination result, the control device 28 transports the recording sheet P for a distance that is longer than the distance from the sensor 26 to the rollers 22, and then stops the rotation of the lower rollers 22*b*. Note that it is also possible to stop the recording sheet P at a position where the rollers 22 grip the recording sheet P, and let the user pull out the recording sheet P.

Upon completion of the above, a label sheet is created, the upper surface of which is printed, and the lower surface of which is coated with the adhesive A.

As described above, with the applying unit 20 of this embodiment, the control device 28 adjusts the rotation speed of the rollers 22 in accordance with the bend of the recording sheet P discharged from the printer 10, the bend being detected by the sensor 26. By this means, regardless of the transport speed of the recording sheet P, the transport speed of the recording sheet P in the applying unit 20 can be made to follow the transport speed in the printer 10. Therefore, even when the applying unit 20 is connected to the printer, it is still possible to apply an adhesive to the recording sheet P. That is, it is possible to provide a highly versatile applying unit 20 that can be retrofitted to various printers without necessitating complex control such as synchronizing the printer and the applying unit.

Also, the applying unit 20 of this embodiment applies an adhesive to the recording sheet P after the recording sheet P is cut in the printer 10. That is, when the recording sheet P is cut, the adhesive is not transferred to the recording sheet P yet, so that no adhesive sticks to the movable blade 14 and the fixed blade 15 of the printer 10. As a result of this, the frequency of cleaning and replacing the movable blade 14 and fixed blade 15 can be reduced.

Also, according to the applying unit 20 of this embodiment, the control device 28 determines the presence or absence of the recording sheet P and adjusts the transport speed of the lower rollers 22*b* based on the detection value obtained by one sensor 26, so that the number of parts does not increase.

Also, according to the applying unit 20 of this embodiment, an adhesive is transferred to the recording sheet P by pressing the adhesive portion 27*b* against the recording sheet P being transported by the rollers 22 and thus applying the adhesive to the recording sheet P. As a result of this, any commercially available solid adhesives and liquid adhesives can be used, without using special adhesives such as adhesive tapes.

Note that, although the recording sheet transported by the rollers was detected by using a photoelectric sensor in the case described in the above embodiment, the present invention is by no means limited to this. For example, another sensor such as a mechanical sensor may be used to detect the bend of the recording sheet.

Also, although the applying portion applied adhesive to the lower surface of the recording sheet in the case described in the above embodiment, the present invention is by no means limited to this. For example, the applying portion may be provided between a pair of upper rollers and apply an adhesive to the upper surface of the recording sheet transported by the rollers. Also, for example, it is possible to provide applying portions between a pair of upper rollers and between a pair of lower rollers, and apply an adhesive to the upper surface of the recording sheet transported by the rollers.

Also, although the applying portion was provided separately from the rollers in the case described in the above embodiment, the present invention is by no means limited to this. For example, the upper rollers themselves and/or the lower rollers themselves may be configured as adhesive portions.

All examples and conditional language provided herein are intended for the purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An applying unit configured for being connected to a printer to apply an adhesive to a recording sheet, the applying unit comprising:

a roller configured to transport the recording sheet that is discharged from the printer;

a sensor disposed between the printer and the roller, and configured to detect a bend of the recording sheet;

an applier configured to apply the adhesive to the recording sheet transported by the roller;

a pressor disposed on a transport path of the recording sheet between the printer and the roller, and configured to bend the recording sheet; and a control device configured to adjust a rotation speed of the roller according to a value detected by the sensor and configured to determine the bend of the recording sheet based on the value detected by the sensor, wherein when the value detected by the sensor is equal to or greater than a bend determining value, the control device increases the rotation speed, and when the value detected by the sensor is less than the bend determining value, the control device slows down the rotation speed.

2. An applying unit configured for being connected to a printer to apply an adhesive to a recording sheet, the applying unit comprising:

a roller configured to transport the recording sheet that is discharged from the printer;

a sensor disposed between the printer and the roller, and configured to detect a bend of the recording sheet;

an applier configured to apply the adhesive to the recording sheet transported by the roller, the applier including a holder configured to hold the adhesive such that the adhesive faces the recording sheet, and a pressor configured to press the holder toward the recording sheet; and a control device configured to adjust a rotation speed of the roller according to a value detected by the sensor and configured to determine the bend of the recording sheet based on the value detected by the sensor, wherein when the value detected by the sensor is equal to or greater than a bend determining value, the control device increases the rotation speed, and when the value detected by the sensor is less than the bend determining value, the control device slows down the rotation speed.

* * * * *